July 11, 1933.  W. W. SLOANE  1,917,607
EXPLOSIONPROOF MOTOR
Filed Aug. 7, 1929  2 Sheets-Sheet 1

Inventor
William W. Sloane
Clarence F. Poole
Attorney

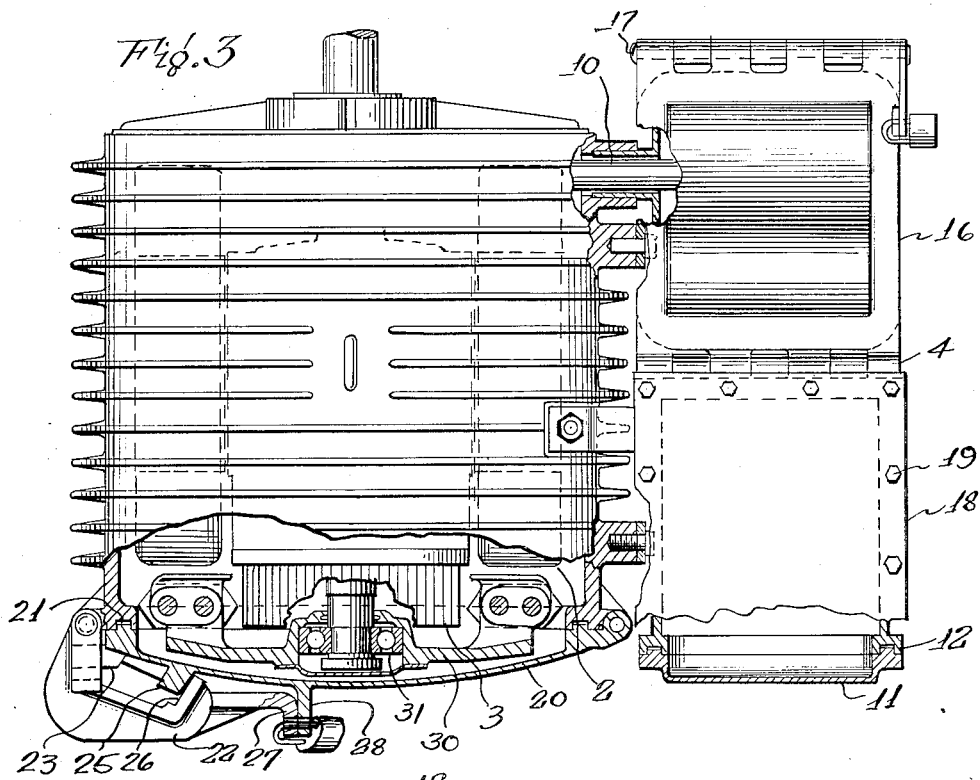
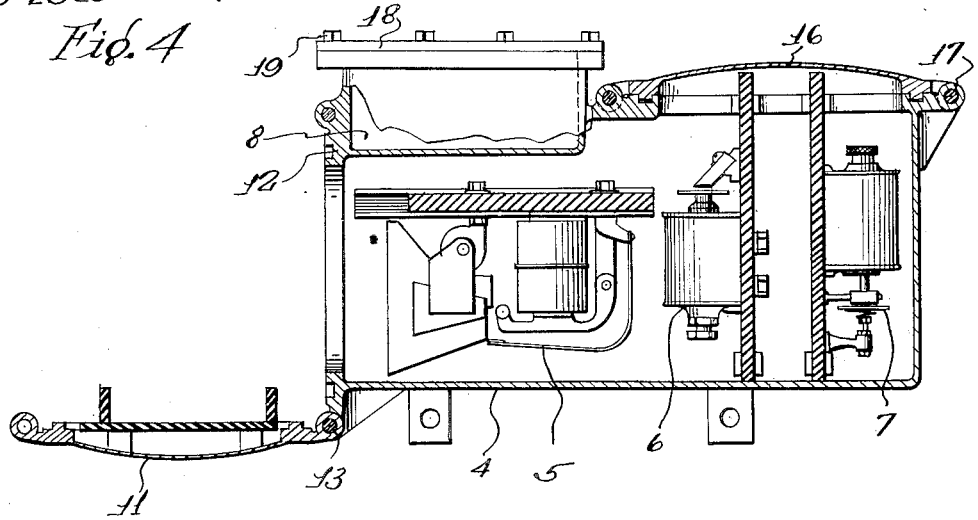

Patented July 11, 1933

1,917,607

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

EXPLOSIONPROOF MOTOR

Application filed August 7, 1929. Serial No. 384,188.

My invention relates to new and useful improvements in explosion proof motors for use in gaseous mines and has among other objects to provide enclosure means for an electric motor and automatic controlling mechanism and resistance therefor which renders the arcing of said electric motor, controlling mechanism or resistance ineffective to ignite explosive gas outside of the enclosure and which while being adapted for access thereinto will practically prevent unauthorized or accidental opening of the enclosures, and to arrange said enclosure so the motor and automatic parts are readily accessible for inspection and repair.

Other objects of my invention will appear from time to time as the specification proceeds.

My invention will be better understood with reference to the accompanying drawings, wherein:

Figure 3 is a top plan view of the device shown in Figure 1 with parts broken away and in section to more clearly show the details of my invention; and Figure 4 is a partial sectional view of a portion of the controlling parts showing details of the enclosure means therefor.

Like numerals refer to like parts throughout the various figures.

Figure 1:
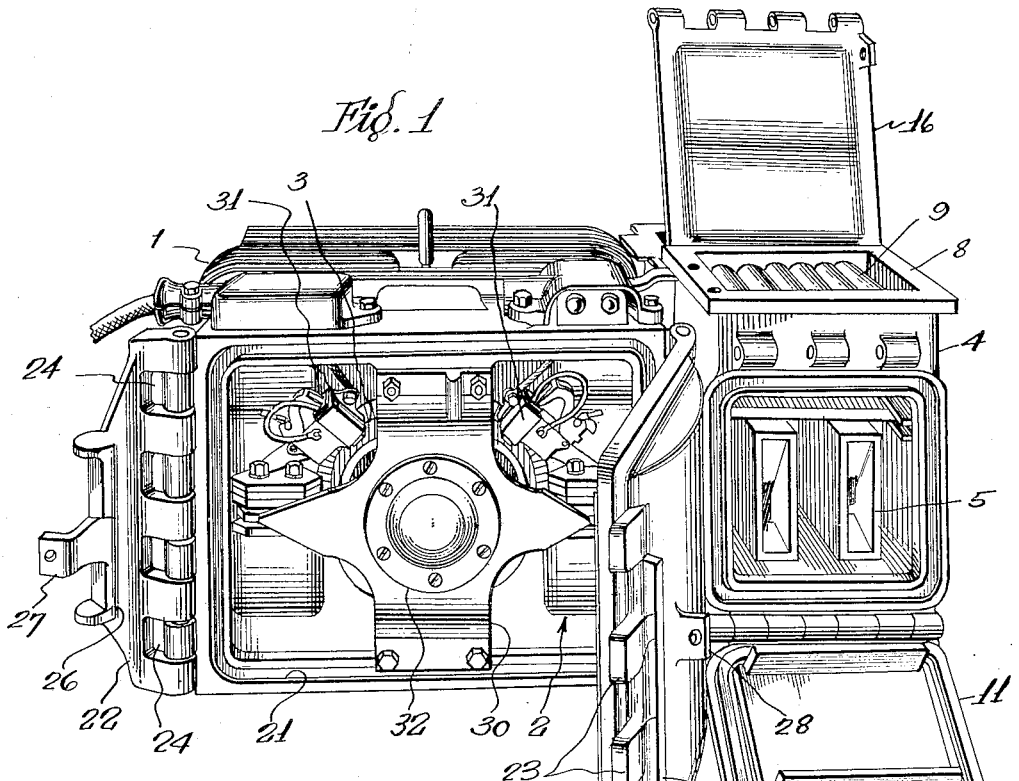
Figure 1 is a perspective view of the device embodying my invention with the enclosure covers open looking at the commutator end of the motor.
Figure 2:
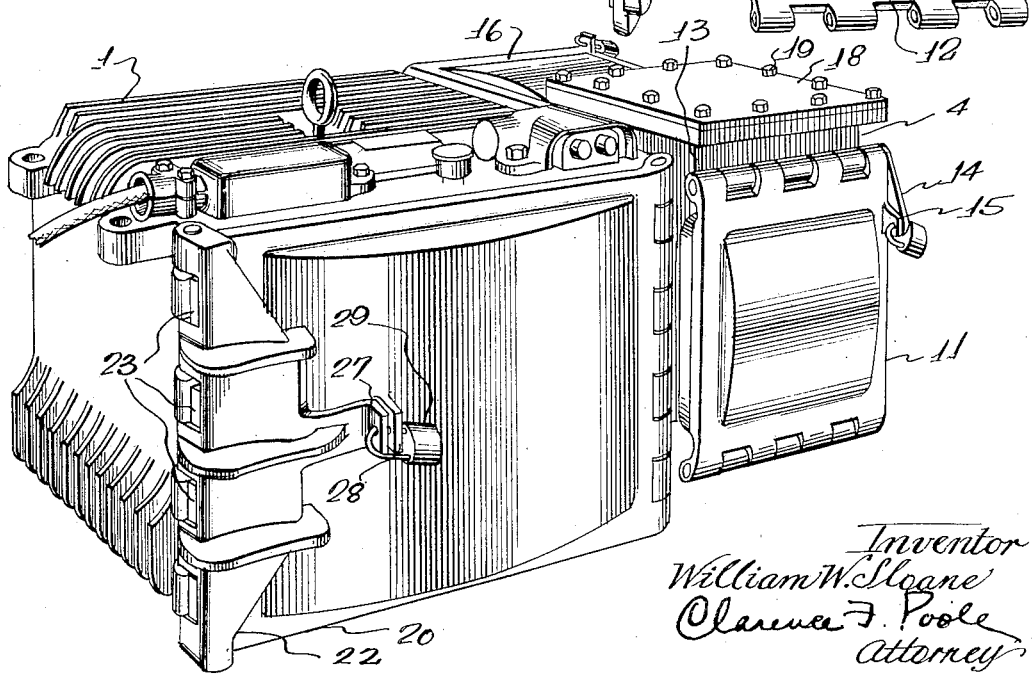
Figure 2 is a perspective view of the device shown in Figure 1 with the enclosure covers in a closed and locked position.

Referring now to the drawings, 1 indicates an enclosure within which is disposed an electric motor 2 having an armature 3. Another enclosure 4 is provided adjacent one side of the enclosure 1 and is attached thereto by means of cap screws or any other suitable means. The enclosure 4 serves to enclose automatic control apparatus, such as contactors of an ordinary type for starting the motor and generally indicated at 5, and an overload relay and low voltage release generally indicated at 6 and 7, respectively. A compartment 8 is provided integral with the enclosure 4 which compartment serves as an enclosure for a rheostat generally indicated at 9. The enclosure 4 is so arranged with respect to the enclosure 1 that all wires leading from said enclosure to the enclosure 1 pass directly to the enclosure 1 and are fully enclosed as is generally indicated at 10 in Figure 3.

A hinged cover 11 is provided for the enclosure 4 preferably at the end adjacent the commutator end of the motor, to provide access to said enclosure for inspection and repair of parts. It should be noted that the opening closed by the cover 11 is of ample dimensions to permit removal of the entire controlling parts if necessary. The joint between the enclosure 4 and cover 11 is of a continuous engaging tongue and groove joint of flame tight construction as is designated at 12 and includes a continuous groove of right angle cross-section surrounding the opening of the enclosure 4 and projecting normal to said opening into the structure of said enclosure and a continuous tongue formation on the cover adapted to register with the groove and projecting normal to the opening when the cover is in a closed position.

Means are provided for positively locking the cover 11 in a closed position which includes a rod 13 insertable through interleaving aligned bored exterior formations on the enclosure 4 and cover 11. An apertured arm 14 is fixed to one end of the rod 13 and registers with an apertured lug 15 formed on the cover 11 so suitable means such as a padlock may be provided to further lock the cover 11 in a closed position and prevent unauthorized opening of said cover.

Similarly, a hinged cover 16 is provided for the top side of the enclosure 4. The joint between the enclosure 4 and cover 16 is of a continuous engaging tongue and groove joint of flame tight construction and the opening closed by the cover 16 is of ample dimensions to permit removal of all operating parts for inspection or repair. The cover 16 is locked in a closed position by means of a rod 17 in a manner similar to that used to lock the cover 11 in a closed position.

The rheostat compartment 8 is closed by means of a cover 18 having joints of ample dimensions to extinguish a flame within said compartment and is held thereto by any suitable means such as cap screws 19, but may be closed by a hinged cover or any other suitable explosion proof closure means.

Referring now in particular to the closure means for the enclosure 1 for the motor 2, I provide a novel closure means so the motor may be accessible for inspection and repair by means of opening said closure, and may be entirely removed from the enclosure 1 through the opening closed by said closure means. For this purpose a hinged cover 20 is provided over the enclosure 1. The joint between the enclosure 1 and the cover 20 is of a continuous engaging tongue and groove joint of flame tight construction as is designated at 21 and is similar to the tongue and groove joint 12 hereinbefore described so will not herein be described in detail.

The cover 20 is positively locked in a closed position by means of a member 22 hinged on one margin of the enclosure 1 and adapted to engage the cover 20. A plurality of outwardly extending aligned formations 23 are provided on the outer side of the cover 20 which are adapted to register with a plurality of aligned apertures 24 formed in the hinged member 22 when the member 22 is closed on the cover 20 to clamp the cover 20 in a tightly closed position on the enclosure 1. An outwardly extending formation 25 is also provided on the cover 20 which is adapted to be engaged by an overhanging lug 26 of the member 22 on the inner face thereof, to aid in maintaining the cover 20 in a tightly closed position on the enclosure 1. An apertured projection 27 from the member 22 registers with an apertured lug 28 on the cover 20 so the cover 20 may be locked against unauthorized opening by means of a padlock 29 or any other suitable locking device.

Referring now to the novel means for supporting the motor 2 within the enclosure 1 for ready accessibility, the opening closed by the cover 20 is of ample proportions to remove the entire motor therethrough and is at the commutator end of the motor so the commutator and brushes may be readily inspected and adjusted. A spider 30 provides a bearing support for the commutator end of the armature 3 and also provides a support for brushes 31, 31, detachably mounted thereon. The spider 30 is removably mounted within the enclosure 1 adjacent the opening thereof by means of cap screws or any other suitable holding device and supports a bearing 32 for the armature 3.

Therefore it may be seen that the support for the armature 3 is such that access to said armature may be had by simply opening the cover 20 and that said armature may be quickly and easily removed from the enclosure 1 by removal of the spider 30. By thus journaling the armature in the spider 30 the cover 20 may be opened and closed at will without interfering with the armature or other motor parts.

Although I have shown and described one form in which my invention may be embodied, it will be understood that the construction and arrangement of the various parts may be changed or altered without departing from the spirit or scope of the invention. Furthermore, I do not wish to be construed as limiting myself to the precise construction illustrated, excepting as it may be limited in the appended claims.

I claim as my invention:

1. In an explosion proof motor, an armature having a shaft, an enclosure for said armature, means for opening or closing said enclosure comprising a hinged cover adjacent the commutator end of said armature and disposed in a plane perpendicular to said armature shaft when closed, said cover and said enclosure being provided with flame proof engaging surfaces, and a spider detachably carried within said enclosure and adjacent said cover for supporting said armature independently of the latter.

2. In an explosion proof motor, an armature having a shaft, an enclosure for said armature, means for opening or closing said enclosure comprising a hinged cover adjacent the commutator end of said armature and disposed in a plane perpendicular to said armature shaft when closed, said cover and said enclosure being provided with flame proof engaging surfaces, a spider detachably carried within said enclosure adjacent said cover, an armature bearing supported by said spider, and motor brushes detachably supported on opposite sides of said spider.

3. In an explosion proof motor, an armature having a shaft, an enclosure for said armature, means for opening or closing said enclosure comprising a hinged cover adjacent the commutator end of said armature and disposed in a plane perpendicular to said armature shaft when closed, said cover and said enclosure being provided with flame proof engaging surfaces, a spider detachably carried within said enclosure and adjacent said cover, an armature bearing supported by said spider, motor brushes detachably supported on opposite sides of said spider, and means for locking said cover in closed position on said enclosure.

4. In an explosion proof motor, an armature having a shaft, an enclosure for said armature, means for opening or closing said enclosure comprising a hinged cover adjacent the commutator end of said armature and disposed in a plane perpendicular to said armature shaft when closed, said cover and said enclosure being provided with flame proof engaging surfaces, a spider within said enclosure and adjacent said cover, an armature bearing supported by said spider, motor brushes detachably supported on opposite sides of said spider, and means for locking said cover in closed position on said enclosure comprising a hinged member engageable with said cover when said cover is in a closed position and a plurality of exterior aligned formations engaged by a plurality of aligned apertures in said hinged member as said hinged member is closed on said cover.

5. In an explosion proof motor, an armature an enclosure for said armature, automatic starting and controlling means for said motor, an enclosure for said automatic starting and controlling means adjacent said enclosure for said armature and having an explosion proof connection therewith, means for opening or closing said enclosure for said armature comprising a part providing an opening into said enclosure of sufficient dimensions to remove said armature from said enclosure and a cover closing said opening, said part and said cover being provided with explosion proof engaging surfaces, a plurality of parts providing openings into said enclosure for said automatic starting and controlling means, each of said openings being of sufficient dimensions to remove said automatic starting and controlling means from said enclosure, and a plurality of covers closing said openings, said parts and said covers being also provided with explosion proof engaging surfaces.

6. In an explosion proof motor, an armature an enclosure for said armature, automatic starting and controlling means for said motor, an enclosure for said automatic starting and controlling means adjacent said enclosure for said armature and having an explosion proof connection therewith, means for opening or closing said enclosure for said armature comprising a part providing an opening into said enclosure of sufficient dimensions to remove said armature from said enclosure and a cover closing said opening, said part and said cover being provided with explosion proof engaging surfaces, a plurality of parts providing openings into said enclosure for said automatic starting and controlling means, each of said openings being of sufficient dimensions to remove said automatic starting and controlling means from said enclosure, and a plurality of covers closing said openings, said parts and said covers being also provided with explosion proof engaging surfaces, said enclosures being so arranged with respect to each other that the wiring passing from said automatic starting and controlling devices to said motor passes directly from one enclosure to the other and is fully enclosed having no contact with the outside air.

7. In an explosion proof motor, an armature an enclosure for said armature, automatic starting and controlling means for said motor, an enclosure for said automatic starting and controlling means adjacent said enclosure for said armature and having an explosion proof connection therewith, means for opening or closing said enclosure for said armature comprising a part providing an opening into said enclosure of sufficient dimensions to remove said armature from said enclosure and a cover closing said opening, said part and said cover being provided with explosion proof engaging surfaces, a plurality of parts providing openings into said enclosure for said automatic starting and controlling means, each of said openings being of sufficient dimensions to remove said automatic starting and controlling means from said enclosure, a plurality of covers closing said openings, said parts and said covers being also provided with explosion proof engaging surfaces, said enclosures being so arranged with respect to each other that the wiring passing from said automatic starting and controlling devices to said motor passes directly from one enclosure to the other and is fully enclosed having no contact with the outside air, and means for positively locking each of said covers in a closed position.

8. In an explosion proof motor, an armature having a shaft, an enclosure for said armature, a part providing an opening into said enclosure of an irregular contour and of sufficient dimensions to permit removal of said armature through said opening, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto and a spider within said enclosure and adjacent said cover for supporting said armature independently of the latter.

9. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto and a spider detachably carried within said enclosure and adjacent said cover for supporting said armature independently of the latter.

10. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto, a spider detachably carried within said enclosure adjacent said cover, an armature bearing supported by said spider, and motor brushes detachably supported on opposite sides of said spider.

11. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto, a spider detachably carried within said enclosure and adjacent said cover, an armature bearing supported by said spider, motor brushes detachably supported on opposite sides of said spider, and means for locking said cover in closed position on said enclosure.

12. In an explosion proof motor, an armature having a shaft, an enclosure for said armature, a part providing an opening into said enclosure of an irregular contour and of sufficient dimensions to permit removal of said armature through said opening, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto.

13. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto.

14. In an explosion proof motor, an armature having a shaft, an enclosure for said armature, a part providing an opening into said enclosure of an irregular contour and of sufficient dimensions to permit removal of said armature through said opening, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto, and means for locking said hinged cover in a closed position with respect to said enclosure.

15. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto, and locking means for positively locking said cover in a closed position with respect to said enclosure comprising a member hinged to said enclosure having a plurality of aligned apertures formed between said member and said enclosure, a plurality of aligned formations on said cover adapted to register with said apertures, an outwardly extending formation on said cover disposed parallel to the pivotal axis of said hinged member and a lug on said hinged member adapted to engage said outwardly extending formation.

16. In an explosion proof motor, an armature having a shaft, an enclosure for said armature, a part providing an opening into said enclosure, a hinged cover for closing said opening disposed adjacent the commutator end of said armature and disposed in a plane perpendicular to said armature shaft when closed, said cover and said part being provided with opposing joint surfaces surrounding said opening having continuous engaging tongue and groove formations thereon and surrounding said opening and projecting normal thereto, and locking means for positively locking said cover in a closed position with respect to said enclosure comprising a member hinged to said enclosure having a plurality of aligned apertures formed between said member and said enclosure, a plurality of aligned formations on said cover adapted to register with said apertures, an outwardly extending formation on said cover disposed parallel to the pivotal axis of said hinged member, a lug on said hinged member adapted to engage said outwardly extending formation, and a locking member engaging said lug and outwardly extending formation.

Signed at Chicago, in the county of Cook and State of Illinois, this 27th day of July, A. D. 1929.

WILLIAM W. SLOANE.